United States Patent
Uehara

(10) Patent No.: US 7,563,738 B2
(45) Date of Patent: Jul. 21, 2009

(54) OPTICAL GLASS

(75) Inventor: Susumu Uehara, Kanagawa (JP)

(73) Assignee: Kabushiki Kaisha Ohara, Sagamihara-Shi, Kanagawa (JP)

( * ) Notice: Subject to any disclaimer, the term of this patent is extended or adjusted under 35 U.S.C. 154(b) by 633 days.

(21) Appl. No.: 11/268,456

(22) Filed: Nov. 8, 2005

(65) Prior Publication Data

US 2006/0100085 A1    May 11, 2006

(30) Foreign Application Priority Data

Nov. 9, 2004    (JP)    ............................. 2004-324907

(51) Int. Cl.
*C03C 3/068*    (2006.01)

(52) U.S. Cl. ...................................... 501/78

(58) Field of Classification Search ............... 501/78
See application file for complete search history.

(56) References Cited

U.S. PATENT DOCUMENTS

| | | | | |
|---|---|---|---|---|
| 4,057,435 A | * | 11/1977 | Boudot et al. | 501/78 |
| 4,119,471 A | * | 10/1978 | Komorita et al. | 501/78 |
| 4,404,290 A | * | 9/1983 | Boudot | 501/78 |
| 4,469,800 A | * | 9/1984 | Boudot et al. | 501/43 |
| 4,732,876 A | | 3/1988 | Nagamine et al. | |
| 6,333,288 B1 | * | 12/2001 | Clement et al. | 501/78 |
| 6,413,894 B1 | | 7/2002 | Sato | |
| 2004/0220041 A1 | * | 11/2004 | Isowaki et al. | 501/78 |

FOREIGN PATENT DOCUMENTS

| | | | |
|---|---|---|---|
| JP | 52084211 A | * | 7/1977 |
| JP | 56078447 A | * | 6/1981 |
| JP | 58130139 A | * | 8/1983 |
| JP | 59060048 A | * | 4/1984 |
| JP | 60-221338 | | 11/1985 |
| JP | 61040839 A | * | 2/1986 |
| JP | 61163138 A | * | 7/1986 |
| JP | 61-232243 | | 10/1986 |
| JP | 62100449 A | * | 5/1987 |
| JP | 04092834 A | * | 3/1992 |
| JP | 05-058669 | | 3/1993 |
| JP | 08-217484 | | 8/1996 |
| JP | 2000-001329 | | 1/2000 |
| JP | 2000-016830 | | 1/2000 |

OTHER PUBLICATIONS

Derwent Abstract 1981-59458D, JP 56-078447 A Jun. 27, 1981.*
Derwent Abstract 1992-155273, JP 04-092834 A Mar. 25, 1992.*
Derwent Abstract 1987-167506, JP 62 100449 A May 9, 1987.*
Derwent 1986-234732, JP 61 163138 A Jul. 23, 1986.*
Derwent Abstract 1986-096811, JP 61 040839 A Feb. 27, 1986.*
Derwent Abstract 1984-110259, JP 59 050048 A Mar. 22, 1984.*
Derwent Abstract 1983-760936, JP 58 130139 A Aug. 3, 1983.*
Derwent Abstract 1977-61694Y, JP 52-084211A Jul. 13, 1977.*
European Office Action application No. 05 024 312.0-2111 dated Apr. 4, 2008.
European Office Action application No. 05 024 312.0-2111 dated Mar. 29, 2007.

* cited by examiner

*Primary Examiner*—Jerry Lorengo
*Assistant Examiner*—Elizabeth A Bolden
(74) *Attorney, Agent, or Firm*—Squire, Sanders & Dempsey, LLP

(57) ABSTRACT

An optical glass has a low glass transition temperature (Tg) and optical constants in which a refractive index ($n_d$) is in the range of from 1.70 to less than 1.74 and an Abbe number ($v_d$) is between 40 and 45 (excluding 40 and 45), has a content of $SiO_2$ is 17% by mass or less, a glass transition temperature (Tg) is 540° C. or less, and a weathering resistance (surface-method) in Class 1 or 2, and has excellent chemical durability, particularly weathering resistance (surface-method) and is appropriate for precision mold press forming.

17 Claims, No Drawings

OPTICAL GLASS

CROSS-REFERENCE TO RELATED APPLICATIONS

This application is based upon and claims the benefit of priority from Japanese Patent application No. 2004-324907 filed on Nov. 9, 2004, the entire contents of which is incorporated herein by reference.

FIELD OF THE INVENTION

The present invention relates to an optical glass which has a low glass transition temperature (Tg) and optical constants in which a refractive index ($n_d$) is in the range of from 1.70 to less than 1.74 and an Abbe number ($v_d$) is between 40 and 45 (excluding 40 and 45), is excellent in chemical durability, particularly, weathering resistance (surface-method), and is appropriate for precision mold press forming.

RELATED ART

There are ordinarily a spherical lens and an aspherical lens in lenses constituting an optical system. Many spherical lenses are manufactured by grinding and polishing a glass formed product obtained by subjecting a glass material to a reheating and pressing forming. On the other hand, it is common for the aspherical lens to be manufactured by a method in which a lens preform material which is heated to be softened is press-formed by a mold having a forming face with high precision such that a configuration of the forming face with high precision of the mold is transferred to a lens preform material, namely, by a precision mold press forming.

When the glass formed product like the aspherical lens is obtained by the precision press molding, since it becomes necessary, as described above, to perform press forming under a high temperature environment, the mold to be used on this occasion is also exposed to a high temperature and subjected to a high pressure. In order to do this, when the lens preform material is heated and thereby softened and also the lens preform material is press-formed, there are many cases in which a forming face of the mold is oxidized or eroded, or a parting film provided on a surface of the mold forming face is damaged, and it then becomes difficult to maintain the forming face with high precision of the mold, and furthermore, the mold itself is liable to be damaged. In that event, it becomes necessary to change the molds, and accordingly, frequencies of changing the molds are increased, and therefore, a large scale production at a low cost cannot be realized. Thus, it is required that the glass which becomes the lens preform material for use in the precision press molding have a glass transition temperature (Tg) as low as possible from the standpoint of suppressing such damage as described above, maintaining the forming face with high precision of the mold for long periods of time and allowing the precision press molding to be performed at a low press pressure.

When the precision press molding is performed, it is necessary that the surface of the glass which becomes the lens preform material be a mirror face or nearly a mirror face. As methods for producing the lens preform material, a method of directly producing from a molten glass by a dropping method and a method of producing by grind-polishing are ordinarily used, and when cost and the number of production steps are taken into consideration, the former method is more popularly used. The lens preform material to be obtained by the dropping method is called a gob or a glass gob. The optical glass for the precision press molding is ordinarily inferior in chemical durability causing fading on the surface of the gob, and then, has a drawback such that the mirror face or a state near to a mirror face cannot be maintained. In particular, there is a problem at the time of storing the gob after being produced, and then, the weathering resistance (surface-method) among such chemical durabilities becomes an important property.

As for the optical glass which becomes the preform material for forming an optical device, for example, the optical glass of a $SiO_2$—$B_2O_3$—$La_2O_3$—$TiO_2$—RO—$R_2O$ system is known; however, from the standpoint of usefulness for an optical design, the optical glass which has optical constants in which the refractive index ($n_d$) is in the range of from 1.70 to less than 1.74 and the Abbe number ($v_d$) is between 40 and 45 (excluding 40 and 45), a low glass transition temperature (Tg) and excellent weathering resistance (surface-method) has been strongly desired.

In JP-A-61-232243, an optical glass of a $SiO_2$—$B_2O_3$—$La_2O_3$—$TiO_2$—$ZrO_2$—$Nb_2O_5$—CaO—$Li_2O$ type is described. However, in this document, the ranges of the optical constants to be targeted are from 1.74 to 1.84 in reference with the refractive index ($n_d$) and from 33 to 40 in reference with the Abbe number ($v_d$) and these ranges do not correspond to those targeted by the present invention.

In JP-A-2000-1329, an optical glass of a $SiO_2$-$B_2O_3$-$La_2O_3$-$TiO_2$-$ZrO_2$-$Nb_2O_5$-CaO-$Li_2O$ type is described. However, since the content of $SiO_2$ is large, a melting property is inferior, and then, in order to maintain the melting property to be favorable, it is necessary to raise the melting temperature, and then, there is a shortcoming in that light transmittance of light in a short wavelength range in a visible light region is reduced.

In JP-A-2000-16830, an optical glass having a low yield point is described. However, since the glass which is specifically described in this document has a high content of $SiO_2$, a melting property is inferior, and in order to maintain a melting property to be favorable, it is necessary to raise a melting temperature, and then, a shortcoming is generated in that light transmittance of light in a short wavelength range in a visible light region is reduced. Furthermore, among various types of glasses specifically described in the document, the glass which has optical constants in the above described ranges is low in $TiO_2$ content, and then, there is a shortcoming in that the chemical durability becomes deteriorated.

In an optical glass described in JP-A-8-217484, since $Lu_2O_3$ of which material cost is extremely high is allowed to be an essential component, production cost becomes extremely high, and then, the optical glass is scarce in practice. Furthermore, an optical glass specifically described in the document does not have optical constants in the above-described ranges, and therefore, does not satisfy the above-described requirements for the optical design.

An optical glass having a low yield point is described in JP-A-5-58669. However, various types of optical glasses specifically described in the document do not have optical constants in the above-described ranges, and accordingly, do not satisfy the above-described requirements for the optical design.

An optical glass specifically described in JP-A-60-221338 does not have optical constants in the above-described ranges, and accordingly, do not satisfy the above-described requirements for the optical design.

SUMMARY OF THE INVENTION

An object of the present invention is to comprehensively solve these shortcomings in reference to the optical glass and to provide an optical glass which has desired optical constants, a low glass transition temperature (Tg), an excellent chemical durability, particularly, excellent weathering resistance (surface-method) and is appropriate for precision mold press forming.

In order to solve the above-described problems, the present inventor has performed extensive research, and as a result, has found that, by allowing each of $SiO_2$, $B_2O_3$, $La_2O_3$, $TiO_2$, $ZrO_2$, $Nb_2O_5$, CaO and $Li_2O$ to be contained in a specified amount and allowing a sum of respective content of $La_2O_3$, $TiO_2$, $ZrO_2$, $Nb_2O_5$, CaO and $Li_2O$ against a sum of respective content of $SiO_2$ and $B_2O_3$ to be a value in a specified range, the optical glass which has the above-described optical constants, the low glass transition temperature (Tg) and the excellent weathering resistance (surface-method) and is appropriate for the precision mold press forming, and furthermore, has an excellent glass stability, can be obtained.

Namely, a first aspect of the present invention for achieving the above-described object is an optical glass, having optical constants in which a refractive index ($n_d$) is in the range of from 1.70 to less than 1.74 and an Abbe number ($v_d$) is between 40 and 45 (excluding 40 and 45), in which a content of $SiO_2$ is 17% by mass or less, a glass transition temperature (Tg) is 540° C. or less and weathering resistance (surface-method) is Class 1 or 2.

A second aspect of the invention is an optical glass, having optical constants in which a refractive index ($n_d$) is in the range of from 1.70 up to 1.74 and an Abbe number ($v_d$) is between 40 and 45 (excluding 40 and 45), containing as essential components $SiO_2$, $B_2O_3$, $La_2O_3$, $TiO_2$, $ZrO_2$, $Nb_2O_5$, CaO and $Li_2O$, being substantially free of lead, arsenic and fluorine, in which a content of $SiO_2$ is 17% by mass or less, a value of $(La_2O_3+Gd_2O_3+Y_2O_3+TiO_2+ZrO_2+Nb_2O_5)/(SiO_2+B_2O_3)$ is from 0.78 to 1.08 on the basis that each component is given in terms of % by mass and a glass transition temperature (Tg) is 540° C. or less.

A third aspect of the invention is the above-described optical glass, in which the weathering resistance (surface-method) is Class 1 or 2.

A fourth aspect of the present invention is the optical glass according to the above-described first aspect, further containing, in terms of % by mass, the following components:

$SiO_2$: more than 10% to 17% or less;
$B_2O_3$: from 15 to 25%;
$La_2O_3$: from 12 to 24%;
$TiO_2$: more than 5% to 12% or less;
$ZrO_2$: from 1 to 10%;
$Nb_2O_5$: from 1% to less than 13%;
CaO: from 5 to 20%; and
$Li_2O$: more than 3% to 15% or less; and together with at least one of:
$Al_2O_3$: from 0 to 3%;
$Y_2O_3$: from 0 to less than 0.1%;
$Gd_2O_3$: from 0 to 5%;
$GeO_2$: from 0 to 10%;
$Ta_2O_5$: from 0 to 5%;
ZnO: from 0 to 8%;
MgO: from 0 to 5%;
BaO: from 0 to 10%;
SrO: from 0 to less than 0.5%; and
$Sb_2O_3$: from 0 to 1%.

A fifth aspect according to the invention is a lens preform material, containing the optical glass according to any one of the above-described first to fourth aspects.

A sixth aspect according to the invention is an optical device produced by subjecting the lens preform material according to the above-described fifth aspect to precision press molding.

A seventh aspect according to the invention is an optical device produced by subjecting the optical glass according to any one of the above-described first to fourth aspects to precision press molding.

DETAILED DESCRIPTION OF THE INVENTION

Next, each component of an optical glass according to the present invention will be described in detail. Unless stated otherwise, the content of each component is given in terms of % by mass.

Since a $SiO_2$ component, in the optical glass according to the invention, is effective in increasing viscosity and enhancing resistance to devitrification of the glass, it is an indispensable component. However, when the $SiO_2$ component is contained in an amount of 10% or less, an effect thereof is insufficient, whereas when it is contained in an amount of more than 17%, a glass transition temperature (Tg) is raised or a melting property is deteriorated. In order to compensate for such deterioration of the melting property, it is necessary to raise a melting temperature. However, in this case, light transmittance in a short wavelength range in a visible light region is deteriorated. Therefore, the $SiO_2$ component can be contained, at the minimum, preferably in an amount of more than 10%, more preferably in an amount of more than 12%, and most preferably, in an amount of more than 13.5%, and at the maximum, preferably in an amount of 17%, more preferably in an amount of less than 17%, and most preferably, in an amount of 16.9%.

The $SiO_2$ component can be introduced into the glass by using, for example, $SiO_2$ as a raw material.

A $B_2O_3$ component is an indispensable component as a glass forming oxide component. However, when the $B_2O_3$ component is contained in an amount of less than 15%, the resistance to devitrification becomes insufficient, whereas when it is contained in an amount of more than 25%, weathering resistance (surface-method) is deteriorated. Therefore, it can be contained, at the minimum, preferably in an amount of 15%, more preferably in an amount of more than 17%, and most preferably, in an amount of 18.1%, and at the maximum, preferably in an amount of 25%, more preferably in an amount of less than 24%, and most preferably, in an amount of 23%.

The $B_2O_3$ component can be introduced into the glass by using, for example, $H_3BO_3$ or $B_2O_3$ as a raw material.

Since an $La_2O_3$ component is effective in increasing a refractive index and realizing a lower dispersion of glass, it is an indispensable component in the optical glass according to the invention. In particular, in order to obtain the optical glass having stable desired optical constants, it is necessary to contain it in combination with a $TiO_2$ component and an $Nb_2O_3$ component. However, when the $La_2O_3$ component is contained in an amount of less than 12%, it is difficult to maintain values of optical constants to be within the above-described ranges, whereas, when it is contained in an amount of more than 24%, the resistance to devitrification is deteriorated. Therefore, the $La_2O_3$ component can be contained, at the minimum, preferably in an amount of 12%, more preferably in an amount of more than 14%, and most preferably, in an amount of 16%, and at the maximum, preferably in an amount of 24%, more preferably in an amount of less than 21%, and most preferably, in an amount of less than 19%.

The $La_2O_3$ component can be introduced into the glass by using, for example, $La_2O_3$, lanthanum nitrate, or any hydrate thereof as a raw material.

$TiO_2$ component is effective in imparting the glass with a high refractive-index high dispersion property and improving the weathering resistance (surface-method). In particular, in order to obtain the optical glass having the stable desired optical constants, it is necessary to contain it in combination with the $La_2O_3$ component and the $Nb_2O_5$ component. Furthermore, although the $TiO_2$ component imparts the glass with the high refractive-index high dispersion property in combination with the $Nb_2O_5$ component, in order to allow the weathering resistance (surface-method) to be favorable, it is effective to allow the $TiO_2$ component to be contained in more than a given amount. When the $TiO_2$ component is contained in an amount of 5% or less, a sufficient effect of improving the weathering resistance (surface-method) cannot be obtained, whereas when it is contained in an amount of more than 12%, the resistance to devitrification and the light transmittance in the short wavelength range in the visible light region are deteriorated. Therefore, the TiO2 component can be contained, at the minimum, preferably in an amount of more than 5%, more preferably in an amount of 5.5%, and most preferably, in an amount of 6%, and at the maximum, preferably in an amount of 12%, more preferably in an amount of 11%, and most preferably, in an amount of 10%.

The $TiO_2$ component can be introduced into the glass by using, for example, $TiO_2$ as a raw material.

Since a $ZrO_2$ component is effective in adjusting the optical constants, improving the resistance to devitrification and enhancing the weathering resistance (surface-method), it is an indispensable component. However, when the $ZrO_2$ component is contained in an amount of less than 1%, an effect thereof is insufficient, whereas when it is contained in an amount of more than 10%, the resistance to devitrification is deteriorated. Therefore, the $ZrO_2$ component can be contained, at the minimum, preferably in an amount of 1%, more preferably in an amount of 2%, and most preferably, in an amount of 3%, and at the maximum, preferably in an amount of 10%, more preferably in an amount of 8%, and most preferably, in an amount of 6%.

The $ZrO_2$ component can be introduced into the glass by using, for example, $ZrO_2$ as a raw material.

The $Nb_2O_5$ component is effective in imparting the glass with the high refractive-index high dispersion property and improving the resistance to devitrification. In particular, in order to obtain the optical glass having the stable desired optical constants, it is necessary to contain it in combination with the $TiO_2$ component and the $La_2O_3$ component. However, when the $Nb_2O_5$ component is contained in an amount of less than 1%, an effect of improving the resistance to devitrification is insufficient, whereas when it is contained in an amount of 13% or more, the resistance to devitrification is undesirably deteriorated. Therefore, the $Nb_2O_5$ component can be contained, at the minimum, preferably in an amount of 1%, more preferably in an amount of more than 5%, and most preferably, in an amount of 5.5%, and at the maximum, preferably in an amount of less than 13%, more preferably in an amount of 11%, and most preferably, in an amount of 10%.

The $Nb_2O_5$ component can be introduced into the glass by using, for example, $Nb_2O_5$ as a raw material.

A ZnO component is effective in reducing a glass transition temperature (Tg). However, when the ZnO component is contained in an amount of more than 8%, the resistance to devitrification is deteriorated. Therefore, it can be contained, at the maximum, preferably in an amount of 8%, more preferably in an amount of 5%, and most preferably, it is not contained at all.

The ZnO component can be introduced into the glass by using, for example, ZnO as a raw material.

An MgO component is effective in adjusting the optical constants. However, when the MgO component is contained in an amount of more than 5%, the resistance to devitrification is deteriorated. Therefore, it can be contained, at the maximum, preferably in an amount of 5%, more preferably in an amount of 4%, and most preferably, in an amount of 3%.

The MgO component can be introduced into the glass by using, for example, any one of MgO, $MgCO_3$, $Mg(OH)_2$ and $Mg(NO_3)_2$ as a raw material.

A CaO component is effective in adjusting the optical constants and improving the resistance to devitrification. However, when the CaO component is contained in an amount of less than 5%, an effect of improving the resistance to devitrification is insufficient, whereas when it is contained in an amount of more than 20%, the chemical durability is deteriorated. Therefore, the CaO component can be contained, at the minimum, preferably in an amount of 5%, more preferably in an amount of more than 6.5%, and most preferably, in an amount of 10.1%, and at the maximum, preferably in an amount of 20%, more preferably in an amount of 19%, and most preferably, in an amount of 18%.

The CaO component can be introduced into the glass by using, for example, any one of CaO, $CaCO_3$, $Ca(OH)_2$ and $Ca(NO_3)_2$ as a raw material.

A SrO component is effective in adjusting the optical constants. However, in the optical glass composition according to the invention, when the SrO component is contained in an amount of 0.5% or more, the resistance to devitrification is deteriorated. Therefore, the SrO component can be contained, at the maximum, preferably in an amount of less than 0.5%, more preferably in an amount of 0.1%, and most preferably, it is not contained at all.

The SrO component can be introduced into the glass by using, for example, any one of SrO, $SrCO_3$, $Sr(OH)_2$ and $Sr(NO_3)_2$ as a raw material.

A BaO component is effective in adjusting the optical constants. However, when the BaO component is contained in an amount of more than 10%, the resistance to devitrification is deteriorated. Therefore, the BaO component can be contained, at the maximum, preferably in an amount of 10%, more preferably in an amount of 9%, and most preferably, in an amount of 8%.

The BaO component can be introduced into the glass by using, for example, any one of BaO, $BaCO_3$, $Ba(OH)_2$ and $Ba(NO_3)_2$ as a raw material.

Since an $Li_2O$ component has effects of reducing the glass transition temperature (Tg) to a great extent, and further, promoting melting of mixed glass materials when they are melted, it is an indispensable component. However, when the $Li_2O$ component is contained in an amount of 3% or less, the effects thereof are insufficient, whereas when it is contained in an amount of more than 15%, the resistance to devitrification is rapidly deteriorated. Therefore, the $Li_2O$ component can be contained, at the minimum, preferably in an amount of more than 3%, more preferably in an amount of 5%, and most preferably, in an amount of 8.1%, and at the maximum, preferably in an amount of 15%, more preferably in an amount of 14%, and most preferably, in an amount of 13%.

The $Li_2O$ component can be introduced into the glass by using, for example, any one of $Li_2O$, $Li_2CO_3$, LiOH and $LiNO_3$ as a raw material.

An $Sb_2O_3$ component can optionally be added for the purpose of defoaming at the time the glass is melted. However, when an added amount thereof is unduly large, the light transmittance in the short wavelength range in the visible light region is deteriorated. Therefore, it is contained, at the maximum, preferably in an amount of 1%, more preferably in an amount of 0.5%, and most preferably, in an amount of 0.2%.

An $Y_2O_3$ component is effective in increasing the refractive index and realizing the lower dispersion of the glass. However, in the optical glass composition according to the invention, when the $Y_2O_3$ component is contained in an amount of 0.1% or more, the resistance to devitrification is rapidly deteriorated. Therefore, it is contained preferably in an amount of less than 0.1%, more preferably in an amount of 0.05% or less, and most preferably, it is not contained at all.

The $Y_2O_3$ component is introduced into the glass by using, for example, $Y_2O_3$ as a raw material.

A $Gd_2O_3$ component is effective in increasing the refractive index and realizing the lower dispersion of the glass. However, when the $Gd_2O_3$ component is contained in an amount of more than 5%, the resistance to devitrification is rapidly deteriorated. Therefore, it is contained preferably in an amount of 5% at the maximum, more preferably in an amount of 1%, and most preferably, it is not contained at all.

The $Gd_2O_3$ component is introduced into the glass by using, for example, $Gd_2O_3$ as a raw material.

A $GeO_2$ component is a component having effects of increasing the refractive index and enhancing the resistance to devitrification. However, since the $GeO_2$ component is extremely expensive, it is contained preferably in an amount of 10% at the maximum, more preferably in an amount of 3%, and most preferably, it is not contained at all.

The $GeO_2$ component is introduced into the glass by using, for example, $GeO_2$ as a raw material.

A $Ta_2O_5$ component is effective in increasing the refractive index and improving the resistance to devitrification. However, since the $Ta_2O_5$ component is expensive, it is contained, at the maximum, preferably in an amount of 5%, more preferably in an amount of 4%, and most preferably, in an amount of 3%.

The $Ta_2O_5$ component is introduced into the glass by using, for example, $Ta_2O_5$ as a raw material.

Furthermore, the raw materials to be used for introducing the components to the above-described glasses are given for the purpose of illustration and are not limited to such oxides as described above. Therefore, the raw materials can appropriately be selected from known materials in accordance with various types of alterations and modifications of production conditions of the glasses.

In order to realize the optical constants in which the refractive index ($n_d$) is in the range of from 1.70 to less than 1.74 and the Abbe number ($v_d$) between 40 and 45 (excluding 40 and 45) which are objects of the invention, it is necessary to allow a ratio of a sum of the $La_2O_3$ component, the $Gd_2O_3$ component, the $Y_2O_3$ component, the $TiO_2$ component, the $ZrO_2$ component and the $Nb_2O_5$ component against a sum of the $SiO_2$ component and the $B_2O_3$ component in terms of % by mass, namely, a value of $(La_2O_3+Gd_2O_3+Y_2O_3+TiO_2+ZrO_2+Nb_2O_5)/(SiO_2+B_2O_3)$ to be set in a specified range. In the invention, it has this time been found that desired optical constants can be satisfied by allowing the value to be set in a range of from 0.78 to 1.08.

Therefore, according to the invention, the value of $(La_2O_3+Gd_2O_3+Y_2O_3+TiO_2+ZrO_2+Nb_2O_5)/(SiO_2+B_2O_3)$ is allowed to be, at the minimum, preferably 0.78, more preferably 0.85, and most preferably, 0.90, and at the maximum, preferably 1.08, more preferably 1.05, and most preferably, 1.02.

An $Al_2O_3$ component is an effective component for enhancing chemical durability. However, when the $Al_2O_3$ component is more than 3%, the resistance to devitrification is rapidly deteriorated. Therefore, it is contained preferably in an amount of 3%, more preferably in an amount of 1%, and most preferably, it is not contained at all.

It is possible to allow any one of $Lu_2O_3$, $Hf_2O_3$, $SnO_2$, $Ga_2O_3$, $Bi_2O_3$ and BeO components to be contained. However, since $Lu_2O_3$, $Hf_2O_3$ and $Ga_2O_3$ are high-priced raw materials, raw material costs increase, and then, it is not practical to contain these components in an actual product. As far as $SnO_2$ is concerned, when the glass raw materials are melted in a crucible made of platinum or in a melting vessel in which a portion to be in contact with a molten glass is made of platinum, tin and platinum are alloyed with each other to form an alloy. A place in which the thus-formed alloy exists has inferior heat resistance and has a risk of causing an accident in which a hole forms and molten glass flows out therefrom. As far as $Bi_2O_3$ and BeO are concerned, there is a problem in that they are components each having an extremely large environmental load such that they each exert harmful effects on the environment. Therefore, they are each contained, at the maximum, preferably in an amount of less than 0.1%, more preferably in an amount of 0.05%, and most preferably, they are not contained at all.

Next, components which are not allowed to be contained in the optical glass according to the invention will be described.

Since fluorine generates a striae or the like by being evaporated when a gob which becomes a lens preform is produced, it is difficult to produce the gob. Therefore, fluorine should not be contained in the optical glass according to the invention.

A lead compound has a problem in that it is a component which is liable to adhere to a mold at the time of performing a precision press molding and presents another problem in that it is a component exerting a large environmental effects such that it is necessary to take environmental measures during the period of from production of the glass to cold working of the glass such as polishing to disposal of the glass. Therefore, the lead compound should not be contained in the optical glass according to the invention.

$As_2O_3$, cadmium and thorium are each a component having large environmental effects such that they each exert harmful influences on the environment. Therefore, these components should not be contained in the optical glass according to the invention.

When $P_2O_5$ is contained in the optical glass according to the invention, the resistance to devitrification is liable to be deteriorated. Therefore, it is not favorable to contain $P_2O_5$.

As far as $TeO_2$ is concerned, when the glass raw materials are melted in a crucible made of platinum or in a melting vessel in which a portion to be in contact with a molten glass is made of platinum, tellurium and platinum are alloyed with each other to form an alloy. A place in which the thus-formed alloy exists is inferior in heat resistance and has a risk of causing an accident in which a hole forms and molten glass flows out therefrom. Therefore, $TeO_2$ should not be contained in the optical glass according to the invention.

In the optical glass according to the invention, it is preferred that coloring components of, for example, V, Cr, Mn, Fe, Co, Ni, Cu, Mo, Eu, Nd, Sm, Tb, Dy and Er are not contained. The term "are not contained" as used herein means that the coloring components are not intentionally contained and are only present as inevitable impurities.

Next, physical properties of the optical glass according to the invention will be described.

As described above, the optical glass according to the invention has, from the standpoint of usefulness for optical design, the optical constants in which the refractive index ($n_d$) and the Abbe number ($v_d$) are preferably in a range of from 1.70 to less than 1.74 and between 40 and 45 (excluding 40 and 45), respectively, more preferably in the range of from 1.71 to less than 1.74, and between 40 and 45 (excluding 40 and 45), respectively, and most preferably, in the range of from 1.71 to less than 1.74 and from 40 to 44 (excluding 40), respectively.

Since, in the glass composition according to the invention, components are given in terms of % by mass, they cannot readily be given in terms of % by mol. However, the composition in which respective elements existing in the glass composition that satisfies various types of properties required in the invention are given in terms of % by mol has the following respective approximate values:

Si: from 4 to 7% by mol;
B: from 8 to 17% by mol;
La: from 1 to 3.5% by mol;
Ti: from 1 to 4% by mol;
Zr: from 0.2 to 2% by mol;
Nb: from 0.2 to 2% by mol;
Ca: from 1.5 to 14% by mol;
Li: from 4 to 23% by mol;
O: from 48 to 66% by mol;
Al: from 0 to 2% by mol;
Y: from 0 to 0.2% by mol;
Gd: from 0 to 1% by mol;
Ge: from 0 to 3.5% by mol;
Ta: from 0 to 1.5% by mol;
Zn: from 0 to 3% by mol;
Mg: from 0 to 2.5% by mol;
Ba: from 0 to 2% by mol;
Sr: from 0 to 0.2% by mol; and
Sb: from 0 to 0.1% by mol.

In the optical glass according to the invention, an Si component is effective in increasing the viscosity of the glass and enhancing the resistance to devitrification, and then, can be contained, at the minimum, preferably in an amount of 4%, more preferably in an amount of 4.5%, and most preferably, in an amount of 5%, and at the maximum, preferably in an amount of 7%, more preferably in an amount of 6.5%, and most preferably, in an amount of 6.2%.

In the optical glass according to the invention, a B component is effective in enhancing the resistance to devitrification as a glass forming oxide, and then, can be contained, at the minimum, preferably in an amount of 8%, more preferably in an amount of 9%, and most preferably, in an amount of 11%, and at the maximum, preferably in an amount of 17%, more preferably in an amount of 16%, and most preferably, in an amount of 15%.

In the optical glass according to the invention, an La component is effective in increasing the refractive index and realizing the lower dispersion of the glass, and then, can be contained, at the minimum, preferably in an amount of 1%, more preferably in an amount of 1.3%, and most preferably, in an amount of 1.5%, and at the maximum, preferably in an amount of 3.5%, more preferably in an amount of 3%, and most preferably, in an amount of 2.8%.

In the optical glass according to the invention, a Ti component is effective in imparting the glass with the high refractive-index high dispersion property and improving the weathering resistance (surface-method), and then, can be contained, at the minimum, preferably in an amount of 1%, more preferably in an amount of 1.3%, and most preferably, in an amount of 1.5%, and at the maximum, preferably in an amount of 4%, more preferably in an amount of 3.5%, and most preferably, in an amount of 3%.

In the optical glass according to the invention, a Zr component is effective in adjusting the optical constants, improving the resistance to devitrification and enhancing the weathering resistance (surface-method), and then, can be contained, at the minimum, preferably in an amount of 0.2%, more preferably in an amount of 0.3%, and most preferably, in an amount of 0.5%, and at the maximum, preferably in an amount of 2%, more preferably in an amount of 1.8%, and most preferably, in an amount of 1.6%.

In the optical glass according to the invention, an Nb component is effective in imparting the glass with the high refractive-index high dispersion property and improving the resistance to devitrification, and then, can be contained, at the minimum, preferably in an amount of 0.2%, more preferably in an amount of 0.3%, and most preferably, in an amount of 0.5%, and at the maximum, preferably in an amount of 2%, more preferably in an amount of 1.8%, and most preferably, in an amount of 1.7%.

In the optical glass according to the invention, a Zn component is effective in reducing the glass transition temperature (Tg), and then, can be contained, at the maximum, preferably in an amount of 3%, more preferably in an amount of 0.8%, and most preferably, it is not contained at all.

In the optical glass according to the invention, an Mg component is effective in adjusting the optical constants, and then, can be contained, at the maximum, preferably in an amount of 2.5%, more preferably in an amount of 2%, and most preferably, in an amount of 1.6%.

In the optical glass according to the invention, a Ca component is effective in adjusting the optical constants and improving the resistance to devitrification, and then, can be contained, at the minimum, preferably in an amount of 1.5%, more preferably in an amount of 2%, and most preferably, in an amount of 3%, and at the maximum, preferably in an amount of 14%, more preferably in an amount of 13%, and most preferably, in an amount of 12%.

In the optical glass according to the invention, an Sr component is effective in adjusting the optical constants, and then, can be contained, at the maximum, preferably in an amount of 0.2%, more preferably in an amount of 0.1%, and most preferably, it is not contained at all.

In the optical glass according to the invention, a Ba component is effective in adjusting the optical constants, and then, can be contained, at the maximum, preferably in an amount of 2%, more preferably in an amount of 1%, and most preferably, in an amount of 0.6%.

In the optical glass according to the invention, an Li component is effective in reducing the glass transition temperature (Tg) to a great extent and promoting melting of the mixed glass raw materials at the time they are melted, and then, can be contained, at the minimum, preferably in an amount of 4%, more preferably in an amount of 5%, and most preferably, in an amount of 6%, and at the maximum, preferably in an amount of 23%, more preferably in an amount of 18%, and most preferably, in an amount of 15%.

In the optical glass according to the invention, an Sb component can optionally be added for the purpose of defoaming at the time the glass is melted, and then, can be contained, at the maximum, preferably in an amount of 0.1%, more preferably in an amount of 0.05%, and most preferably, in an amount of 0.02%.

In the optical glass according to the invention, a Y component is effective in increasing the refractive index and realizing the lower dispersion of the glass, and then, can be contained preferably in an amount of 0.2%, more preferably in an amount of 0.1% or less, and most preferably, it is not contained at all.

In the optical glass according to the invention, a Gd component is effective in increasing the refractive index and realizing the lower dispersion of the glass, and then, can be contained, at the maximum, preferably in an amount of 1%, more preferably in an amount of 0.5%, and most preferably, it is not contained at all.

In the optical glass according to the invention, a Ge component is effective in increasing the refractive index and enhancing the resistance to devitrification, and then, can be contained, at the maximum, preferably in an amount of 3.5%, more preferably in an amount of 1.5%, and most preferably, it is not contained at all.

In the optical glass according to the invention, a Ta component is effective in increasing the refractive index and improving the resistance to devitrification, and then, can be contained, at the maximum, preferably in an amount of 1.5%, more preferably in an amount of 1%, and most preferably, in an amount of 0.5%.

In the optical glass according to the invention, an Al component is effective in enhancing the chemical durability, and then, can be contained, at the maximum, preferably in an amount of 2%, more preferably in an amount of 1.5%, and most preferably, in an amount of 1.3%.

O is an indispensable component is glass forming in the glass according to the invention, and then, can be contained, at the minimum, preferably in an amount of 48% by mol, more preferably in an amount of 49% by mol, and most preferably, in an amount of 50% by mol, and at the maximum, preferably in an amount of 66%, more preferably in an amount of 63%, and most preferably, in an amount of 60%.

In the optical glass according to the invention, when the Tg is unduly low, the chemical durability becomes deteriorated, and accordingly, the weathering resistance (surface-method) becomes deteriorated. On the other hand, when the Tg is unduly high, as described above, in a case in which the precision press molding is performed, deterioration or the like of a forming mold is liable to occur. Therefore, the Tg of the optical glass according to the invention is set to be, at the minimum, preferably 440° C., more preferably 450° C., and most preferably, 460° C., and at the maximum, preferably 540° C., more preferably less than 530° C., and most preferably, 520° C.

The term "weathering resistance (surface-method)" as used herein denotes a relative merit of a degraded state occurring after exposure to a storage environment for a certain period of time, since it is expected that the lens preform material, namely, the gob, is stored before it is subjected to the precision press molding.

A testing method of the weathering resistance (surface-method) follows a method described below to determine the weathering resistance (surface-method). Specifically, a sample having a polished face with dimensions of 30 mm×30 mm×3 mm is used as a test piece. After the sample is placed in a thermohygrostat for 24 hours at 50° C. 85% RH, the polished face thereof is observed under a 50× microscope to inspect the degraded state. Judgment criteria of such degraded states are as follows:

Class 1: fading is not observed at all on the sample at 6000 luxes which has been placed in the thermohygrostat for 24 hours;

Class 2: fading is not observed at all on the sample at 1500 luxes but fading is observed thereon at 6000 luxes;

Class 3: fading is observed on the sample at 1500 luxes; and furthermore, when a new sample is placed in the thermohygrostat for 6 hours at 50° C. 85% RH, and then, the polished face thereof is observed under a microscope at 50×, the sample in which fading is observed at 1500 luxes is defined as Class 4 and the sample in which fading is observed is allowed to remain as Class 3.

The weathering resistance (surface-method) required in the optical glass according to the invention is preferably Class 2, and more preferably, Class 1.

In the optical glass according to the invention, in order to realize stable production by a production method described below, it is important to set a liquid phase temperature to be at 1000° C. or less. In particular, by allowing the temperature to be preferably 950° C. or less, a viscosity range capable of performing the stable production can be wider, and furthermore, a glass melting temperature can be reduced; therefore, energy consumption can be reduced.

The term "liquid phase temperature" as used herein denotes a lowest temperature at which no crystals are observed when a crushed glass sample is placed on a platinum plate, held for 30 minutes in an oven having a temperature gradient, taken out of the oven, and then, the presence or absence of crystals in softened glass is observed under a microscope.

As described above, the optical glass according to the invention can be used as a preform material for press forming or a molten glass thereof can be directly pressed. When it is used as the preform material, a production method and a precision press molding method thereof are not particularly limited and known production methods and known forming methods can be employed. As for the production methods for the preform material, the preform material can directly be produced by a forming method for a glass gob as described in, for example, JP-A-8-319124, or from a molten glass by a production method and a production apparatus for an optical glass as described in, for example, JP-A-8-73229, or additionally, maybe produced by subjecting a strip material to cold-working.

In a case in which the preform is produced by allowing the molten glass of the optical glass according to the invention to fall in drops, when the viscosity of the molten glass is unduly low, a striae is liable to be generated in the glass preform, whereas when the viscosity is unduly high, it becomes difficult to cut the glass by a relative force between its own weight and a surface tension of the glass.

Therefore, in order to perform a high-quality stable production, a value of logarithm of the viscosity (dPa.s) at the liquid phase temperature, namely, log q is preferably in the range of from 0.4 to 2.0, more preferably in the range of from 0.5 to 1.8, and most preferably, in the range of from 0.6 to 1.6.

The precision press molding method for the preform is not particularly limited and a method as in a forming method for an optical device as described in, for example, JP-B-62-41180 can be employed.

EXAMPLES

Hereinafter, embodiments according to the invention will be described; however, they should not be interpreted as limiting the invention in any way.

Compositions of Examples (No. 1 to No. 20) of the glasses according to the invention are shown in Tables 1 to 4 together with each refractive index ($n_d$), glass transition temperature (Tg), yield point (At) and surface-method weathering durability. In these Tables, compositions of individual components are given in terms of % by mass.

TABLE 1

|  | 1 | 2 | 3 | 4 | 5 |
|---|---|---|---|---|---|
| $SiO_2$ | 16.800 | 15.300 | 16.800 | 16.800 | 16.800 |
| $B_2O_3$ | 21.390 | 22.900 | 22.800 | 21.400 | 21.400 |
| $Al_2O_3$ |  |  |  |  |  |
| $La_2O_3$ | 17.410 | 17.400 | 16.000 | 18.900 | 20.800 |
| $TiO_2$ | 7.600 | 7.600 | 7.600 | 6.100 | 6.600 |
| $ZrO_2$ | 4.500 | 4.500 | 4.500 | 4.500 | 4.500 |
| $Nb_2O_5$ | 7.900 | 7.900 | 7.900 | 7.900 | 5.600 |
| ZnO |  |  |  |  |  |
| MgO | 1.000 | 1.000 | 1.000 | 1.000 | 1.000 |
| CaO | 14.800 | 14.800 | 14.800 | 14.800 | 14.800 |
| BaO |  |  |  |  |  |
| $Li_2O$ | 8.500 | 8.500 | 8.500 | 8.500 | 8.500 |
| $Sb_2O_3$ | 0.100 | 0.100 | 0.100 | 0.100 | 0.100 |
| Total | 100.000 | 100.000 | 100.000 | 100.000 | 100.000 |
| $(La_2O_3 + Gd_2O_3 + Y_2O_3 + TiO_2 + ZrO_2 + Nb_2O_5)/(SiO_2 + B_2O_3)$ | 0.980 | 0.979 | 0.909 | 0.979 | 0.979 |
| $n_d$ | 1.73030 | 1.73080 | 1.72130 | 1.72505 | 1.72180 |
| $v_d$ | 40.6 | 40.5 | 41.1 | 42.5 | 44.0 |
| Tg (° C.) | 491 | 488 | 490 | 488 | 487 |
| At (° C.) | 528 | 525 | 526 | 525 | 527 |
| Weathering resistance (surface-method) (Class) | 2 | 2 | 2 | 2 | 2 |

TABLE 2

|  | 6 | 7 | 8 | 9 | 10 |
|---|---|---|---|---|---|
| $SiO_2$ | 16.800 | 16.800 | 16.800 | 16.800 | 16.800 |
| $B_2O_3$ | 21.400 | 19.900 | 21.400 | 21.400 | 21.400 |
| $Al_2O_3$ |  |  |  |  |  |
| $La_2O_3$ | 17.400 | 18.900 | 18.900 | 17.400 | 17.400 |
| $TiO_2$ | 7.600 | 7.600 | 7.600 | 9.100 | 7.600 |
| $ZrO_2$ | 4.500 | 4.500 | 3.000 | 4.500 | 6.900 |
| $Nb_2O_5$ | 7.900 | 7.900 | 7.900 | 6.400 | 5.500 |
| ZnO |  |  |  |  |  |
| MgO | 1.000 | 1.000 | 1.000 | 1.000 | 1.000 |
| CaO | 16.800 | 14.800 | 14.800 | 14.800 | 14.800 |
| BaO |  |  |  |  |  |
| $Li_2O$ | 6.500 | 8.500 | 8.500 | 8.500 | 8.500 |
| $Sb_2O_3$ | 0.100 | 0.100 | 0.100 | 0.100 | 0.100 |
| Total | 100.000 | 100.000 | 100.000 | 100.000 | 100.000 |
| $(La_2O_3 + Gd_2O_3 + Y_2O_3 + TiO_2 + ZrO_2 + Nb_2O_5)/(SiO_2 + B_2O_3)$ | 0.979 | 1.060 | 0.979 | 0.979 | 0.979 |
| $n_d$ | 1.73930 | 1.73930 | 1.72880 | 1.73255 | 1.72780 |
| $v_d$ | 41.1 | 40.2 | 41.2 | 40.1 | 41.6 |
| Tg (° C.) | 520 | 493 | 485 | 490 | 493 |
| At (° C.) | 558 | 530 | 521 | 530 | 533 |
| Weathering resistance (surface-method) (Class) | 2 | 1 | 2 | 1 | 2 |

TABLE 3

|  | 11 | 12 | 13 | 14 | 15 |
|---|---|---|---|---|---|
| $SiO_2$ | 16.800 | 14.300 | 16.800 | 16.800 | 16.800 |
| $B_2O_3$ | 21.000 | 22.900 | 21.400 | 21.400 | 21.400 |
| $Al_2O_3$ |  |  |  |  |  |
| $La_2O_3$ | 17.400 | 18.400 | 17.400 | 17.400 | 14.400 |
| $TiO_2$ | 6.000 | 7.600 | 7.600 | 7.600 | 7.600 |
| $ZrO_2$ | 4.500 | 4.500 | 4.500 | 4.500 | 4.500 |
| $Nb_2O_5$ | 9.900 | 7.900 | 7.900 | 7.900 | 7.900 |
| ZnO |  |  |  |  |  |
| MgO | 1.000 | 0.500 | 3.000 | 1.000 | 1.000 |
| CaO | 14.800 | 15.300 | 12.800 | 10.800 | 17.800 |
| BaO |  |  |  | 4.000 |  |

TABLE 3-continued

|  | 11 | 12 | 13 | 14 | 15 |
|---|---|---|---|---|---|
| $Li_2O$ | 8.500 | 8.500 | 8.500 | 8.500 | 8.500 |
| $Sb_2O_3$ | 0.100 | 0.100 | 0.100 | 0.100 | 0.100 |
| Total | 100.000 | 100.000 | 100.000 | 100.000 | 100.000 |
| $(La_2O_3 + Gd_2O_3 + Y_2O_3 + TiO_2 + ZrO_2 + Nb_2O_5)/(SiO_2 + B_2O_3)$ | 1.000 | 1.032 | 0.979 | 0.979 | 0.901 |
| $n_d$ | 1.73130 | 1.73730 | 1.73030 | 1.72830 | 1.72580 |
| $v_d$ | 40.8 | 40.1 | 40.6 | 40.9 | 41.4 |
| Tg (° C.) | 489 | 487 | 483 | 492 | 480 |
| At (° C.) | 525 | 527 | 527 | 528 | 519 |
| Weathering resistance (surface-method) (Class) | 2 | 2 | 2 | 2 | 2 |

TABLE 4

|  | 16 | 17 | 18 | 19 | 20 |
|---|---|---|---|---|---|
| $SiO_2$ | 16.800 | 16.800 | 16.800 | 16.800 | 16.800 |
| $B_2O_3$ | 21.400 | 18.400 | 19.800 | 21.400 | 21.400 |
| $Al_2O_3$ |  | 3.000 |  |  |  |
| $La_2O_3$ | 17.400 | 17.400 | 16.000 | 17.400 | 13.400 |
| $TiO_2$ | 7.600 | 7.600 | 7.600 | 7.600 | 7.600 |
| $ZrO_2$ | 4.500 | 4.500 | 4.500 | 4.500 | 6.500 |
| $Nb_2O_5$ | 7.900 | 7.900 | 7.900 | 7.900 | 7.900 |
| ZnO |  |  | 3.000 |  |  |
| MgO | 1.000 | 1.000 | 1.000 |  | 1.000 |
| CaO | 12.800 | 14.800 | 14.800 | 15.800 | 16.800 |
| BaO |  |  |  |  |  |
| $Li_2O$ | 10.500 | 8.500 | 8.500 | 8.500 | 8.500 |
| $Sb_2O_3$ | 0.100 | 0.100 | 0.100 | 0.100 | 0.100 |
| Total | 100.000 | 100.000 | 100.000 | 100.000 | 100.000 |
| $(La_2O_3 + Gd_2O_3 + Y_2O_3 + TiO_2 + ZrO_2 + Nb_2O_5)/(SiO_2 + B_2O_3)$ | 0.979 | 1.063 | 0.984 | 0.979 | 0.927 |
| $n_d$ | 1.72080 | 1.73030 | 1.73510 | 1.73030 | 1.72930 |
| $v_d$ | 40.1 | 40.6 | 40.1 | 40.6 | 40.3 |
| Tg (° C.) | 469 | 495 | 475 | 491 | 482 |
| At (° C.) | 496 | 531 | 518 | 530 | 521 |
| Weathering resistance(surface-method) (Class) | 2 | 1 | 2 | 2 | 2 |

Furthermore, compositions of glasses of Comparative Examples (No. A to No. F) are shown in Table 5 together with each refractive index ($n_d$), Abbe number ($v_d$), glass transition temperature (Tg), yield point (At) and weathering resistance (surface-method) of these glasses.

TABLE 5

|  | A | B | C | D | E | F |
|---|---|---|---|---|---|---|
| $SiO_2$ | 17.600 | 19.500 | 18.200 | 12.000 | 16.000 | 8.000 |
| $B_2O_3$ | 20.000 | 17.900 | 21.900 | 22.000 | 21.000 | 26.500 |
| $Al_2O_3$ | 4.000 |  |  |  |  |  |
| $Y_2O_3$ |  |  |  |  | 10.000 |  |
| $La_2O_3$ | 12.200 | 11.200 | 13.000 | 29.000 | 15.500 | 26.000 |
| $TiO_2$ | 4.900 | 4.900 | 3.900 | 7.000 | 13.500 | 10.000 |
| $ZrO_2$ | 5.200 | 5.200 | 6.200 | 4.500 | 1.500 | 2.000 |
| $Nb_2O_5$ | 13.400 | 13.400 | 13.400 | 8.000 | 4.500 | 5.000 |
| $Ta_2O_5$ |  |  |  | 2.000 |  |  |
| ZnO |  |  |  | 3.000 |  | 6.000 |
| MgO |  |  |  |  |  |  |
| CaO | 17.400 | 18.400 | 12.400 | 11.000 | 6.000 | 14.000 |
| BaO |  |  |  |  |  |  |
| $Li_2O$ | 5.300 | 9.500 | 6.000 | 6.500 | 6.000 | 6.000 |
| $Na_2O$ |  |  |  |  |  | 2.000 |
| $Sb_2O_3$ |  |  |  |  |  | 0.500 |
| Total |  |  |  |  |  |  |

TABLE 5-continued

|  | A | B | C | D | E | F |
|---|---|---|---|---|---|---|
| $(La_2O_3+Gd_2O_3+Y_2O_3+TiO_2+ZrO_2+Nb_2O_5)/(SiO_2+B_2O_3)$ | 0.949 | 0.928 | 0.910 | 1.426 | 1.216 | 1.246 |
| $n_d$ | 1.72945 | 1.72466 | 1.73491 | 1.76160 | 1.77028 | 1.74715 |
| $v_d$ | 40.4 | 40.8 | 40.2 | 39.6 | 35.9 | 39.1 |
| Tg (° C.) | 534 | 481 | 525 | 511 | 525 | 483 |
| At (° C.) | 576 | 520 | 566 | 552 | 567 | 525 |
| Weathering resistance (surface-method) (Class) | 3 | 3 | 3 | 2 | 2 | 2 |

The optical glasses according to Examples (No. 1 to No. 20) of the invention as shown in Tables 1 to 4 were able to be obtained by weighing raw materials for an ordinary optical glass such as an oxide, a hydroxide, a carbonate and a nitrate such that they come to have respective ratios in compositions of Examples shown in Tables 1 to 4, mixing the thus-weighed raw materials, filling the resultant mixture in a platinum crucible, melting the mixture for 3 to 5 hours at a temperature of from 1000 to 1300° C. varying hours and temperatures in accordance with melting properties of compositions, clarify-stir-homogenizing the thus-molten mixture, casting the thus-homogenized mixture into a mold or the like, and then, gradually cooling the thus-cast mixture.

The refractive index ($n_d$) and the Abbe number ($v_d$) were measured on the optical glass obtained with a gradual-cooling rate of −25° C./hour.

The glass transition temperature (Tg) was measured in accordance with a method described in Japanese Optical Glass Industrial Association Standards JOGIS08-[2003] "Measuring Method for Thermal Expansion of Optical Glass". In this situation, a sample having a length of 50 mm and a diameter of 4 mm was used as a test piece.

The yield point (At) was measured in a same manner as in the glass transition temperature (Tg) and defined as a temperature at which an elongation of the glass was terminated and the glass started to shrink.

A testing method of the weathering resistance (surface-method) follows a method described below to determine the weathering resistance (surface-method). A sample having a polished face with sizes of 30 mm×30 mm×3 mm was used as a test piece. After the sample was placed in a thermohygrostat for 24 hours at 50° C. and 85% RH, the polished face thereof was observed under a microscope at 50 to observe a degraded state. Judgment criteria of such degraded states were as follows:

Class 1: fading was not observed at all on the sample. at 6000 luxes which has been placed in the thermohygrostat for 24 hours;

Class 2: fading was not observed at all on the sample at 1500 luxes but fading was observed thereon at 6000 luxes;

Class 3: fading was observed on the sample at 1500 luxes; further, when a new sample was placed in the thermohygrostat for 6 hours at 50° C. and 85% RH, and then, the polished face thereof was observed under the microscope at 50×, the sample in which fading was observed at 1500 luxes was defined as Class 4 and the sample in which fading was not observed was allowed to remain as Class 3.

As is seen in Tables 1 to 4, since all of the optical glasses of the Examples (No. 1 to No. 20) according to the invention have the optical constants (refractive index ($n_d$) and Abbe number ($v_d$)) within the above-described ranges and the glass transition temperature (Tg) in the range of from 440 to 540° C., they are appropriate for the precision mold press forming, and furthermore, since they were favorable in the evaluation of the weathering resistance (surface-method), they were also excellent in chemical durability.

To contrast, glasses were produced by using samples of Comparative Examples A to F of compositions as shown in Table 5 in the same conditions as in the Examples, and then, the thus-produced glasses were evaluated by same evaluation methods. Comparative Examples A, B, and C each had a low content of $TiO_2$, and then, the weathering resistances (surface-method) thereof were evaluated as Class 3. For this reason, these Comparative Examples did not satisfy the performance required in the invention. Furthermore, in each of Comparative Examples D, E, and F, a value of $(La_2O_3+Gd_2O_3+Y_2O_3+TiO_2+ZrO_2+Nb_2O_5)/(SiO_2+B_2O_3)$ in terms of % by mass was out of the range of from 0.78 to 1.08 and the refractive index ($n_d$) and the Abbe number ($v_d$) were out of the ranges of from 1.70 to less than 1.74 and from 40 to 45 (excluding 40 and 45), respectively. For these reasons, these Comparative Examples did not satisfy the performance required in the invention.

Although the invention has been described in detail for the purpose of illustration, the present embodiments and examples are given to illustrate the invention. It should be understood that various types of alterations, modifications and variations can be made within the spirit and scope of the invention by those skilled in the art.

As described above, the optical glass according to the invention is a glass of the $SiO_2$-$B_2O_3$-$La_2O_3$-$TiO_2$-$ZrO_2$-$Nb_2O_5$-CaO-$Li_2O$ type which is free of lead, arsenic, and fluorine, has optical constants in which the refractive index ($n_d$) is in the range of from 1.70 to less than 1.74 and the Abbe number ($v_d$) is between 40 and 45 (excluding 40 and 45), has the glass transition temperature (Tg) in the range of from 440 to 540° C. and is appropriate for the precision mold press forming. Therefore, the optical glass according to the invention is industrially extremely useful.

Furthermore, since the optical glass according to the invention is excellent in weathering resistance (surface-method), when the lens preform material, namely, a gob, is stored before being subjected to the precision press molding, it does not undergo significant fading or the like even after being exposed to a storage environment for a given period of time and is convenient to handle.

What is claimed is:

1. An optical glass, having optical constants in which a refractive index ($n_d$) is in the range of from 1.70 to less than 1.74 and an Abbe number ($v_d$) is between 40 and 45 (excluding 40 and 45), and being substantially free of fluorine, wherein a content of $SiO_2$ is 17% by mass or less, a glass transition temperature (Tg) is 540° C. or less, and weathering resistance (surface-method) is Class 1 or 2.

2. An optical glass, having optical constants in which a refractive index ($n_d$) is in the range of from 1.70 to less than 1.74 and an Abbe number ($v_d$) is between 40 and 45 (excluding 40 and 45), containing as essential components $SiO_2$, $B_2O_3$ $La_2O_3$, $TiO_2$, $ZrO_2$, $Nb_2O_5$, CaO and $Li_2O$, and being substantially free of lead, arsenic, and fluorine, wherein a content of SiO2 is 17% by mass or less, a value of ($La_2O_3$+$Gd_2O_3$+$Y_2O_3$+$TiO_2$+$ZrO_2$+$Nb_2O_5$)/($SiO_2$+$B_2O_3$) is from 0.78 to 1.08 on the basis that each component is given in terms of % by mass and a glass transition temperature (Tg) is 540° C. or less.

3. The optical glass according to claim 2, wherein the weathering resistance (surface-method) is Class 1 or 2.

4. The optical glass according to claim 1, further comprising, in terms of % by mass, the following components:
$SiO_2$: more than 10% to 17%;
$B_2O_3$: from 15 to 25%;
$La_2O_3$: from 12 to 24%;
$TiO_2$: more than 5% to 12%;
$ZrO_2$: from 1 to 10%;
$Nb_2O_5$: from 1% to less than 13%;
CaO: from 5 to 20%; and
$Li_2O$: more than 3% to 15% ; and, together with at least one of:
$Al_2O_3$: from 0 to 3%;
$Y_2O_3$: from 0 to less than 0.1%;
$Gd_2O_3$: from 0 to 5%;
$GeO_2$: from 0 to 10%;
$Ta_2O_5$: from 0 to 5%;
ZnO: from 0 to 8%;
MgO: from 0 to 5%;
BaO: from 0 to 10%;
SrO: from 0 to less than 0.5%; and
$Sb_2O_3$: from 0 to 1%.

5. The optical glass according to claim 2, further comprising, in terms of % by mass, the following components:
$SiO_2$: more than 10% to 17%;
$B_2O_3$: from 15 to 25%;
$La_2O_3$: from 12 to 24%;
$TiO_2$: more than 5% to 12%;
$ZrO_2$: from 1 to 10%;
$Nb_2O_5$: from 1% to less than 13%;
CaO: from 5 to 20%; and
$Li_2O$: more than 3% to 15%; and, together with at least one of:
$Al_2O_3$: from 0 to 3%;
$Y_2O_3$: from 0 to less than 0.1%;
$Gd_2O_3$: from 0 to 5%;
$GeO_2$: from 0 to 10%;
$Ta_2O_5$: from 0 to 5%;
ZnO: from 0 to 8%;
MgO: from 0 to 5%;
BaO: from 0 to 10%;
SrO: from 0 to less than 0.5%; and
$Sb_2O_3$: from 0 to 1%.

6. A lens preform material, comprising the optical glass according to claim 1.

7. A lens preform material, comprising the optical glass according to claim 2.

8. An optical device produced by subjecting the lens preform material according to claim 6 to precision press molding.

9. An optical device produced by subjecting the lens preform according to claim 7 to precision press molding.

10. An optical device produced by subjecting the optical glass according to claim 1 to precision press molding.

11. An optical device produced by subjecting the optical glass according to claim 2 to precision press molding.

12. The optical glass according to claim 1, further comprising, in terms of % by mass, the following components:
$La_2O_3$: from 12 to 24%; and, together with at least one of:
BaO: from 0 to 10%; and
ZnO: from 0 to 8%;
and being substantially free of lead and cadmium.

13. The optical glass according to claim 12, wherein a content of SrO is less than 0.5% by mass.

14. The optical glass according to claim 2, further comprising, in terms of % by mass, the following components:
$La_2O_3$: from 12 to 24%; and, together with at least one of:
BaO: from 0 to 10%; and
ZnO: from 0 to 8%;
and being substantially free of lead and cadmium.

15. The optical glass according to claim 14, wherein a content of SrO is less than 0.5% by mass.

16. The optical glass according to claim 1, wherein a content of $Li_2O$ is from 5% to 15% by mass.

17. The optical glass according to claim 2, wherein a content of $Li_2O$ is from 5% to 15% by mass.

* * * * *